(12) United States Patent
Shuto et al.

(10) Patent No.: US 10,504,301 B2
(45) Date of Patent: Dec. 10, 2019

(54) DEVICE FOR DISPLAYING AVAILABLE TRAVEL DISTANCE OF VEHICLE

(71) Applicant: HONDA MOTOR CO., LTD., Tokyo (JP)

(72) Inventors: Kenta Shuto, Wako (JP); Takashi Tetsuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 200 days.

(21) Appl. No.: 15/714,236

(22) Filed: Sep. 25, 2017

(65) Prior Publication Data
US 2018/0089908 A1 Mar. 29, 2018

(30) Foreign Application Priority Data
Sep. 29, 2016 (JP) ................................. 2016-192126

(51) Int. Cl.
| | |
|---|---|
| *G07C 5/00* | (2006.01) |
| *G01F 23/32* | (2006.01) |
| *B60K 15/03* | (2006.01) |
| *G01F 23/24* | (2006.01) |

(Continued)

(52) U.S. Cl.
CPC .............. *G07C 5/004* (2013.01); *B60K 35/00* (2013.01); *B60K 37/02* (2013.01); *G01F 23/246* (2013.01); *G01F 23/32* (2013.01); *B60K 2015/03217* (2013.01); *B60K 2015/03223* (2013.01); *B60K 2370/169* (2019.05); *B60L 2260/52* (2013.01); *B60Y 2300/52* (2013.01)

(58) Field of Classification Search
None
See application file for complete search history.

(56) References Cited

U.S. PATENT DOCUMENTS 4,046,998 A * 9/1977 Kuno ...................... G01F 9/001
377/24
4,217,644 A * 8/1980 Kato ...................... G01F 9/008
377/21
(Continued)

FOREIGN PATENT DOCUMENTS

| JP | 4188107 B2 | 11/2008 |
|---|---|---|
| JP | 5503524 B2 | 5/2014 |

OTHER PUBLICATIONS

European Patent Office, European Search Report application No. 17192013.5, dated Dec. 1, 2017.

*Primary Examiner* — Navid Ziaeian Mehdizadeh
(74) *Attorney, Agent, or Firm* — Squire Patton Boggs (US) LLP (57) ABSTRACT

A display device also includes an available amount-of-fuel calculator for calculating an available amount of fuel, an average mileage calculator for calculating an average mileage from a consumed amount of fuel and a vehicle's traveled distance, an available travel distance calculator for calculating an available travel distance from the available amount of fuel and the average mileage, and a display unit for displaying the available travel distance. The available amount-of-fuel calculator uses a learned value based on outputs as a corrective value for correcting the output of a second sensor when the calculation of the available amount of fuel switches from being based on the output of the second sensor to being based on the output of a first sensor.

12 Claims, 7 Drawing Sheets

(51) Int. Cl.
  *B60K 35/00*  (2006.01)
  *B60K 37/02*  (2006.01)

(56) References Cited

U.S. PATENT DOCUMENTS

| | | | | |
|---|---|---|---|---|
| 4,400,779 A * | 8/1983 | Kosuge | ................... | G01F 9/023 |
| | | | | 701/123 |
| 4,437,162 A * | 3/1984 | Kato | ................... | F02B 77/08 |
| | | | | 340/618 |
| 4,590,568 A * | 5/1986 | Barske | ................... | B60K 31/18 |
| | | | | 701/123 |
| 5,826,459 A * | 10/1998 | Kataoka | ................ | G01F 23/303 |
| | | | | 73/290 R |
| 6,453,731 B1 * | 9/2002 | Yaegashi | ............... | B60K 35/00 |
| | | | | 73/114.52 |
| 7,024,317 B1 * | 4/2006 | George | ................... | G01F 9/001 |
| | | | | 702/100 |
| 7,219,539 B1 * | 5/2007 | Bauerle | ............... | B60R 16/0236 |
| | | | | 73/114.54 |
| 9,707,909 B2 * | 7/2017 | Weinberg | ........... | B60R 16/0236 |
| 9,758,045 B2 * | 9/2017 | Iwaya | ................... | B60K 6/442 |
| 9,896,044 B2 * | 2/2018 | Beechie | .............. | B60R 16/0236 |
| 10,017,175 B2 * | 7/2018 | Saito | ................... | B60K 6/442 |
| 2003/0056824 A1 * | 3/2003 | Harvey | ............... | F02M 37/0047 |
| | | | | 137/265 |
| 2003/0069684 A1 * | 4/2003 | Reimer | ................ | B60K 15/077 |
| | | | | 701/123 |
| 2003/0221675 A1 * | 12/2003 | Washeleski | ...... | B60K 15/03504 |
| | | | | 123/497 |
| 2004/0008109 A1 * | 1/2004 | Endoh | ............... | B60R 16/0232 |
| | | | | 340/450.2 |
| 2004/0079149 A1 * | 4/2004 | Sawert | ................. | B06B 1/0292 |
| | | | | 73/290 V |
| 2005/0060087 A1 * | 3/2005 | Kim | ................... | F02D 29/02 |
| | | | | 701/123 |
| 2007/0176762 A1 * | 8/2007 | Aoyagi | ................. | B60W 50/14 |
| | | | | 340/439 |
| 2007/0189906 A1 * | 8/2007 | Palvolgyi | ............ | B60K 15/077 |
| | | | | 417/36 |
| 2007/0247291 A1 * | 10/2007 | Masuda | ................ | F02D 11/105 |
| | | | | 340/439 |
| 2009/0109022 A1 * | 4/2009 | Gangopadhyay | .. | G01C 21/3407 |
| | | | | 340/540 |
| 2010/0042340 A1 * | 2/2010 | Piszko | ................... | G01F 9/008 |
| | | | | 702/55 |
| 2010/0090818 A1 * | 4/2010 | Sekiyama | ........... | B60R 16/0236 |
| | | | | 340/439 |
| 2010/0145638 A1 | 6/2010 | Begin | | |
| 2011/0140877 A1 * | 6/2011 | Gilchrist | ................ | B60K 15/04 |
| | | | | 340/450.2 |
| 2011/0241859 A1 * | 10/2011 | Handa | .................... | B60K 6/448 |
| | | | | 340/438 |
| 2012/0116606 A1 * | 5/2012 | Ichinokawa | ........... | B60K 35/00 |
| | | | | 701/1 |
| 2013/0047963 A1 * | 2/2013 | Horsting | ................ | B60K 15/04 |
| | | | | 123/456 |
| 2015/0134226 A1 * | 5/2015 | Palmer | ................. | B60W 40/10 |
| | | | | 701/101 |
| 2015/0185063 A1 * | 7/2015 | Lee | ......................... | G01F 9/023 |
| | | | | 701/123 |
| 2015/0285670 A1 * | 10/2015 | Takahashi | ............ | F02D 41/222 |
| | | | | 73/1.73 |
| 2015/0302670 A1 * | 10/2015 | Ulrey | .................... | G07C 5/0816 |
| | | | | 701/123 |
| 2016/0103009 A1 * | 4/2016 | Milton | .................... | G01F 23/36 |
| | | | | 73/313 |
| 2016/0167643 A1 * | 6/2016 | Tabanoglu | ................ | B60L 3/12 |
| | | | | 701/22 |
| 2017/0136946 A1 * | 5/2017 | Yanatsubo | ............... | B60Q 9/00 |
| 2017/0199069 A1 * | 7/2017 | McBride | ................. | G01F 23/22 |
| 2017/0363459 A1 * | 12/2017 | Kim | ..................... | G01F 23/2962 |
| 2017/0369009 A1 * | 12/2017 | Vucelic | .................. | B60K 35/00 |

\* cited by examiner

DEVICE FOR DISPLAYING AVAILABLE TRAVEL DISTANCE OF VEHICLE

CROSS-REFERENCE TO RELATED APPLICATIONS

The present application claims priority under 35 USC 119 to Japanese Patent Application No. 2016-192126 filed Sep. 29, 2016 the entire contents of which are hereby expressly incorporated by reference.

TECHNICAL FIELD

The present invention relates to a display device for displaying an available travel distance of a vehicle, the display device being inexpensive by using two sensor outputs and being capable of increasing a range in which the available travel distance can be displayed.

BACKGROUND ART

Patent Document 1 discloses an available travel distance display device for calculating the travelable distance of a vehicle based on a hypothetical amount-of-fuel value determined by subtracting a consumed amount of fuel and displaying the calculated travelable distance, the available travel distance display device including a travelable distance display device for gradually correcting the hypothetical amount-of-fuel value to approach an estimated amount-of-fuel value determined on the basis of the output of a reserve sensor when the available amount of fuel becomes equal to or lower than a reserve point (point E).

Also, Patent Document 2 discloses a display device for displaying the available travel distance of a vehicle by multiplying a reference mileage rate based on an interval mileage rate by the available amount of fuel when the available amount of fuel becomes equal to or lower than a reserve point (point E).

CITATION LIST

Patent Literature

Patent Document 1: JP 5503524 B2
Patent Document 1: JP 4188107 B2

SUMMARY OF INVENTION

Technical Problem

The above related art, however, has not taken account of calculating and displaying an available travel distance over a wide range through the effective use of a plurality of fuel sensors.

For example, Patent Document 2 deals with displaying an available travel distance in case the available amount of fuel becomes equal to or lower than the reserve point, where the range in which the available travel distance can be displayed is limited. Similarly, according to Patent Document 1, only the measurement range of one sensor is taken into account. In addition, the display device has a highly costly arrangement as the burden of performing arithmetic operations is large. In order to increase the range in which the available travel distance can be displayed, a number of sensors are required, resulting in an increase in the cost, because the fuel tanks of two-wheeled vehicles are of a structure having an intermittently changing cross-sectional shape.

In view of the above problems of the related art, it is an object of the present invention to provide a display device for displaying an available travel distance of a vehicle, the display device being inexpensive and capable of increasing a range in which the available travel distance can be displayed, thereby making itself user-friendly, irrespectively of the shape of a fuel tank on the vehicle.

Solution to Problems

To achieve the afore-mentioned object, the present invention has a first feature in that a display device (1) for displaying an available travel distance of a vehicle by calculating an available amount of fuel (AF) in a fuel tank (T) on the basis of outputs (1SO, 2SO) of a first sensor and a second sensor (1S, 2S) which are provided in the fuel tank (T), the second sensor (2S) detecting the available amount of fuel (AF) in the fuel tank (T) at a fuel level higher than a reserve point (D5) in the fuel tank (T), the display device (1) comprising: an available amount-of-fuel calculator (2) configured to calculate the available amount of fuel (AF) from the output (1SO) of the first sensor (1S) at a fuel level lower than the reserve point (D5) and from the output (2SO) of the second sensor (2S) at a fuel level higher than the reserve point (D5); an average mileage calculator (3) configured to calculate an average mileage (FC) from a consumed amount of fuel (FI) and a vehicle's traveled distance (V) per unit time; an available travel distance calculator (4) configured to calculate an available travel distance (AD) from the available amount of fuel (AF) and the average mileage (FC); and a display unit (30) configured to display the available travel distance (AD), wherein the available amount-of-fuel calculator (2) uses a learned value (Δ) based on the outputs (2SO, 1SO) of the first and second sensors (1S, 2S) as a corrective value for correcting the output (2A) of the second sensor (2S) when the calculation of the available amount of fuel (AF) switches from being based on the output (2SO) of the second sensor (2S) to being based on the output (1SO) of the first sensor (1S).

The present invention has a second feature in that the first sensor (1S) detects a fuel level at the reserve point (D5) in the fuel tank (T), and the second sensor (2S) includes a sensor of a fuel sender unit.

The present invention has a third feature in that the available amount-of-fuel calculator (2) calculates the available amount of fuel (AF) on the basis of the output (2SO) of the second sensor (2S) at a fuel level higher than the reserve point (D5), as an available amount-of-fuel reference (SA) by correcting a measured available amount of fuel (2A) represented by the output (2SO) with the learned value (Δ).

The present invention has a fourth feature in that the learned value (Δ) includes a difference between the measured available amount of fuel (2A) represented by the output (2SO) of the second sensor (2S) when the first sensor (1S) detects the reserve point (D5) and a predetermined available amount of fuel at the reserve point (D5).

The present invention has a fifth feature in that the available amount-of-fuel calculator (2) calculates the available amount-of-fuel reference (SA) by subtracting a value produced by multiplying the learned value (Δ) that includes the difference by a corrective coefficient which varies as the measured available amount of fuel (2A) represented by the output (2SO) approaches the reserve point (D5), from the measured available amount of fuel (2A).

Advantageous Effects of Invention

According to the first feature, a display device (1) for displaying an available travel distance of a vehicle by calculating an available amount of fuel (AF) in a fuel tank (T) on the basis of outputs (1SO, 2SO) of a first sensor and a second sensor (1S, 2S) which are provided in the fuel tank (T), the second sensor (2S) detecting the available amount of fuel (AF) in the fuel tank (T) at a fuel level higher than a reserve point (D5) in the fuel tank (T), the display device (1) comprising: an available amount-of-fuel calculator (2) configured to calculate the available amount of fuel (AF) from the output (1SO) of the first sensor (1S) at a fuel level lower than the reserve point (D5) and from the output (2SO) of the second sensor (2S) at a fuel level higher than the reserve point (D5); an average mileage calculator (3) configured to calculate an average mileage (FC) from a consumed amount of fuel (FI) and a vehicle's traveled distance (V) per unit time; an available travel distance calculator (4) configured to calculate an available travel distance (AD) from the available amount of fuel (AF) and the average mileage (FC); and a display unit (30) configured to display the available travel distance (AD), wherein the available amount-of-fuel calculator (2) uses a learned value (Δ) based on the outputs (2SO, 1SO) of the first and second sensors (1S, 2S) as a corrective value for correcting the output (2A) of the second sensor (2S) when the calculation of the available amount of fuel (AF) switches from being based on the output (2SO) of the second sensor (2S) to being based on the output (1SO) of the first sensor (1S). Therefore, not only the available travel distance (AD) that is equal to or smaller than the reserve point (D5) is displayed on the basis of the output (1SO) of the first sensor (1S), but also the available travel distance (AD) is displayed on the vehicle on the basis of the output (2SO) of the second sensor (2S) even if fuel is stored in the fuel tank (T) at a level higher than the reserve point (D5). Thus, the display device is highly user-friendly for the driver of the vehicle.

According to the second feature, the first sensor (1S) detects a fuel level at the reserve point (D5) in the fuel tank (T), and the second sensor (2S) includes a sensor of a fuel sender unit. Therefore, since the sensor in the fuel sender unit is used as the second sensor (2S), the number of sensors installed in the fuel tank is reduced. Consequently, the display device may be of an inexpensive structure.

According to the third feature, the available amount-of-fuel calculator (2) calculates the available amount of fuel (AF) on the basis of the output (2SO) of the second sensor (2S) at a fuel level higher than the reserve point (D5), as an available amount-of-fuel reference (SA) by correcting a measured available amount of fuel (2A) represented by the output (2SO) with the learned value (Δ). And according to the fourth feature, the learned value (Δ) includes a difference between the measured available amount of fuel (2A) represented by the output (2SO) of the second sensor (2S) when the first sensor (1S) detects the reserve point (D5) and a predetermined available amount of fuel at the reserve point (D5). Therefore, since the measured available amount of fuel (2A) is corrected by the learned value (Δ), the difference between the low limit value of the fuel sender unit as the second sensor (2S) and the upper limit value of the reserve sensor as the first sensor (1S) can be reduced. Therefore, even when the calculated available amount of fuel switches from the fuel sender unit to the reserve sensor, the available travel distance (AD) can be displayed in smooth transition. The display device is thus highly user-friendly. Furthermore, the accuracy of the output value (2SO) of the second sensor (2S) and the measured value (2A) of the available amount (AF) of fuel based thereon can be increased by the learned value (Δ).

According to the fifth feature, the available amount-of-fuel calculator (2) calculates the available amount-of-fuel reference (SA) by subtracting a value produced by multiplying the learned value (Δ) that includes the difference by a corrective coefficient which varies as the measured available amount of fuel (2A) represented by the output (2SO) approaches the reserve point (D5), from the measured available amount of fuel (2A). Therefore, the corrective efficient that is given increases as the available amount of fuel approaches the reserve point (D5), so that the subtractive correction is applied in a manner to change stepwise as the available amount of fuel approaches the reserve point (D5). Consequently, the available travel distance can be displayed in smooth transition. The display device is thus highly user-friendly.

DESCRIPTION OF EMBODIMENTS

Figure 1:
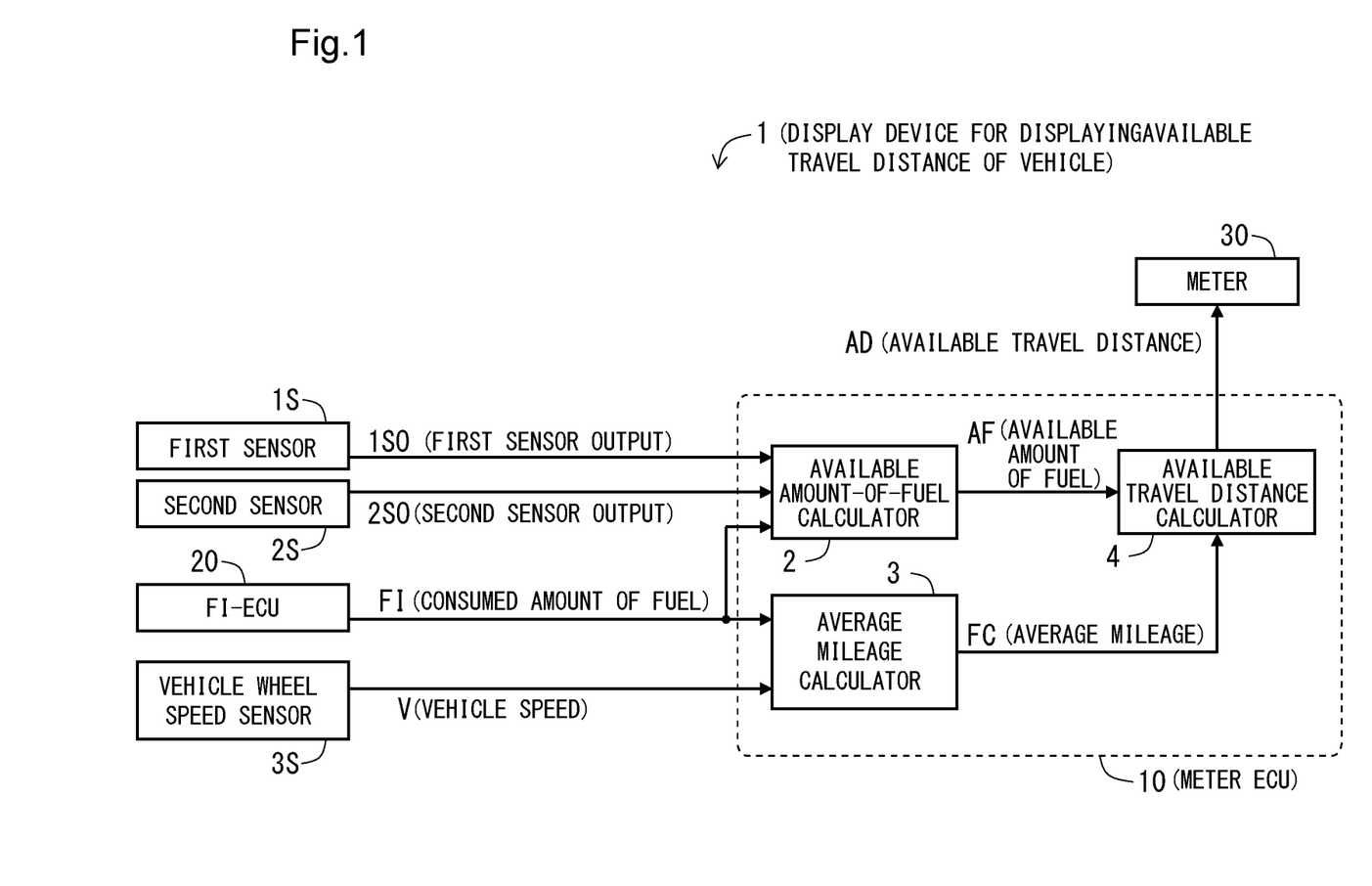
FIG. 1 is a functional block diagram of a display device for displaying an available travel distance of a vehicle according to an embodiment of the present invention.

FIG. 1 is a functional block diagram of a display device for displaying an available travel distance of a vehicle according to an embodiment of the present invention. As depicted in FIG. 1, a display device 1 for displaying an available travel distance of a vehicle such as a motorcycle or the like (hereinafter referred to as "display device 1" in the present specification) includes, as major components, a meter electronic control unit (ECU) 10, a first sensor 1S, a second sensor 2S, a fuel injection electronic control unit (FI-ECU) 20, and a vehicle wheel speed sensor 3S that send various output signals to the meter ECU 10, and a meter 30 for displaying an available travel distance output from the meter ECU 10.

The first sensor 1S detects the available amount of fuel in the fuel tank of the vehicle in a first mode and produces a first sensor output 1SO representing the detected available amount of fuel. The second sensor 2S detects the available amount of fuel in the fuel tank of the vehicle in a second mode and produces a second sensor output 2SO representing the detected available amount of fuel. Details of the first sensor 1S and the second sensor 2S will be described later with reference to FIG. 2.

The FI-ECU 20 controls fuel injection in the engine of the vehicle and produces an output representative of an injected amount of fuel FI per unit time, i.e., a consumed amount of fuel FI, controlled thereby. The vehicle wheel speed sensor 3S detects the speed of wheels of the vehicle as a vehicle speed V, e.g., a vehicle's traveled distance V per unit time, and outputs the detected vehicle speed V. The meter 30, which may include a known display device such as a liquid crystal display device and/or a fluorescent display tube, displays an available travel distance AD of the vehicle output from the meter ECU 10.

The meter ECU 10 further includes, as functional components implemented when it performs respective individual particular functions, an available amount-of-fuel calculator 2, an average mileage calculator 3, and an available travel distance calculator 4. General processing sequences of these calculators 2 through 4 are as follows.

The available amount-of-fuel calculator 2 receives the first sensor output 1SO from the first sensor 1S or/and the second sensor output 2SO from the second sensor 2S, and the injected amount of fuel FI from the FI-ECU 20, calculates an available amount of fuel AF in the fuel tank of the vehicle, and outputs the calculated available amount of fuel AF to the available travel distance calculator 4. Functional details of the available amount-of-fuel calculator 2 will be described later.

The average mileage calculator 3 receives the injected amount of fuel FI output from the FI-ECU 20 and the vehicle speed V output from the vehicle wheel speed sensor 3S, calculates an average mileage FC of the vehicle, and outputs the calculated average mileage FC to the available travel distance calculator 4. Here, the average mileage can be calculated from a distance traveled by the vehicle and an amount of fuel consumed by the vehicle over a predetermined time, the traveled distance and the consumed amount of fuel being determined by respectively adding up vehicle speeds V and injected amounts of fuel FI over the predetermined time, according to the following equation:

(Average mileage $FC$)=(Traveled distance)÷(Consumed amount of fuel)÷(Predetermined time)

Alternatively, the average mileage FC may be calculated in a manner to reflect the history of an average mileage FC of the vehicle over a certain period of time in the past and the characteristics (habitual behaviors) of the driver of the vehicle, according to the process disclosed in Patent Document 2 referred to above, or may be calculated using any of various existing processes.

The available travel distance calculator 4 receives the available amount of fuel AF output from the available amount-of-fuel calculator 2 and the average mileage FC output from the average mileage calculator 3, calculates an available travel distance AD of the vehicle, and outputs the calculated available travel distance AD to the meter 30.

Figure 2:
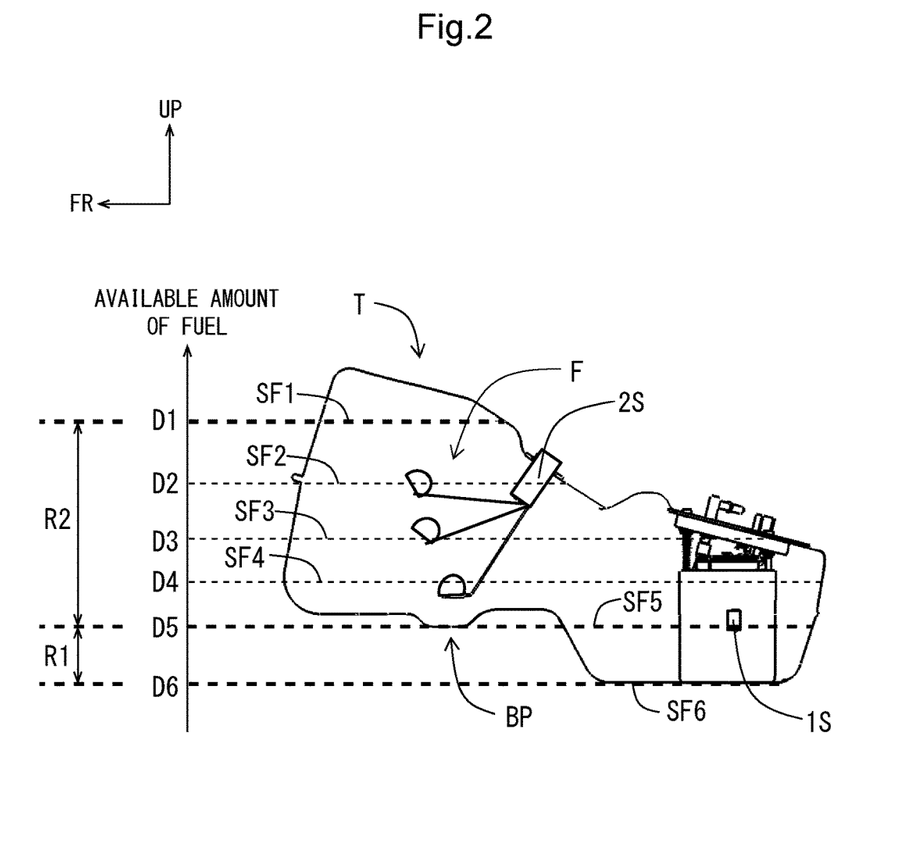
FIG. 2 is a sectional side elevational view of a fuel tank illustrating a configuration example of a first sensor and a second sensor according to an embodiment of the present invention.

FIG. 2 is a sectional side elevational view of a fuel tank T, serving as the fuel tank of the vehicle referred to above, which incorporates the first sensor 1S and the second sensor 2S according to the present embodiment. FIG. 2 also depicts an upward direction UP and a forward direction FR of the vehicle on which the fuel tank T is mounted.

The first sensor 1S is in the form of a level gage including a thermistor, for example, and serves as a reserve sensor on the fuel tank T. The first sensor 1S can detect when the available amount of fuel AF becomes lower than a reserve point D5, or more specifically, an available amount of fuel AF at the reserve point D5. In other words, if the vehicle keeps driving and is not refilled with fuel after the first sensor 1S has detected the reserve point D5, then the available amount of fuel AF in the fuel tank T falls in a range R1 from the reserve point D5 and an out-of-gas point D6. FIG. 2 schematically illustrates a fuel level SF5 at the reserve point D5 and a fuel level SF6 at the out-of-gas point D6, i.e., the bottom surface SF6 of the fuel tank T.

The second sensor 2S is coupled to an arm extending from a float F of a float-type fuel sender unit in the fuel tank T, so that the second sensor 2S may serve as an angular displacement sensor for detecting the angle of the arm as an angular displacement. The second sensor 2S outputs an available amount of fuel AF in a range R2 from a full-of-gas point D1 to the reserve point D5 of the fuel tank T. As is well known from the mechanism of the floating-type fuel sender unit, the second sensor S2 as the angular displacement sensor can determine an available amount of fuel AF from the angle of the arm according to the following procedure:

(Procedure 1) Detecting an arm angle $\theta$.

(Procedure 2) Converting the arm angle $\theta$ to a fuel depth d.

(Procedure 3) Determining an available amount of fuel AF from the fuel depth d.

For converting the arm angle $\theta$ to a fuel depth d (Procedure 2) and calculating an available amount of fuel AF from the fuel depth d (Procedure 3), a predetermined equation may be used which reflects shape information of the fuel tank T that represents the cross-sectional area S(d) at each fuel depth d, etc. and layout and structure information of the fuel sender unit in the fuel tank T that represents the length of the arm, etc. The predetermined equation may be given as table data.

In FIG. 2, the range R2 from the full-of-gas point D1 to the reserve point D5 of the fuel tank T for the available amount of fuel AF detected by the second sensor 2S is demarcated into a plurality of zones at points D2, D3, and D4 successively arranged in the descending order of amounts of fuel. FIG. 2 schematically depicts fuel levels SF1, SF2, SF3, SF4, and SF5 in the fuel tank T respectively at the points D1, D2, D3, D4, and D5 for the available amount of fuel AF. FIG. 2 depicts the float F at the fuel levels SF2, SF3, and SF4 by schematically overlapping. FIG. 2 also depicts that a lowermost point BP that can be reached by the float F as corresponding to the fuel level SF5 at the reserve point D5. The respective points D1, D2, D3, D4, D5, and D6 will be referred to as illustrative zone demarcating points for indicating respective levels of the available amount of fuel AF.

As described above with reference to FIG. 2, according to the present embodiment, the second sensor 2S detects the available amount of fuel AF in the range R2 in which the available amount of fuel AF is relatively large in the fuel tank T, and the first sensor 1S detects the reserve point D5 that is located at the lower limit of the range R2 and the upper limit of the range R1.

Therefore, the display device 1 depicted in FIG. 1 is capable of displaying an available travel distance AD over the ranges R1 and R2 using the output signals from the first sensor 1S and the second sensor 2S. Specifically, while the available amount of fuel AF is in the range R2, the display device 1 displays an available travel distance AD based on the available amount of fuel AF detected by the second sensor 2S. When the vehicle keeps driving after the available amount of fuel AF has reached the reserve point D5 at the lower limit of the range R2, i.e., while the available amount of fuel AF is in the range R1, the display device 1 determines the time at which the available amount of fuel AF has reached the reserve point D5 using the output signal from the first sensor 1S, acquires an available amount of fuel AF at the reserve point D5, and displays an available travel distance AD determined from the acquired available amount of fuel AF, and actual data of the injected amount of fuel FI and the vehicle speed V at subsequent times.

In particular, the available amount of fuel AF that is required to determine the available travel distance AD can be determined in the range R2 by the second sensor 2S included in a single fuel sender unit, without the need for a number of individual sensors. The reserve point D5 can be detected highly accurately by the first sensor 1S in the form of a level gage, so that the available amount of fuel AF subsequent to the reserve point D5 can be calculated highly accurately. The display device 1 according the present embodiment is able to display the available travel distance AD in the ranges R1 and R2 at a low cost and with high accuracy.

Figure 3:
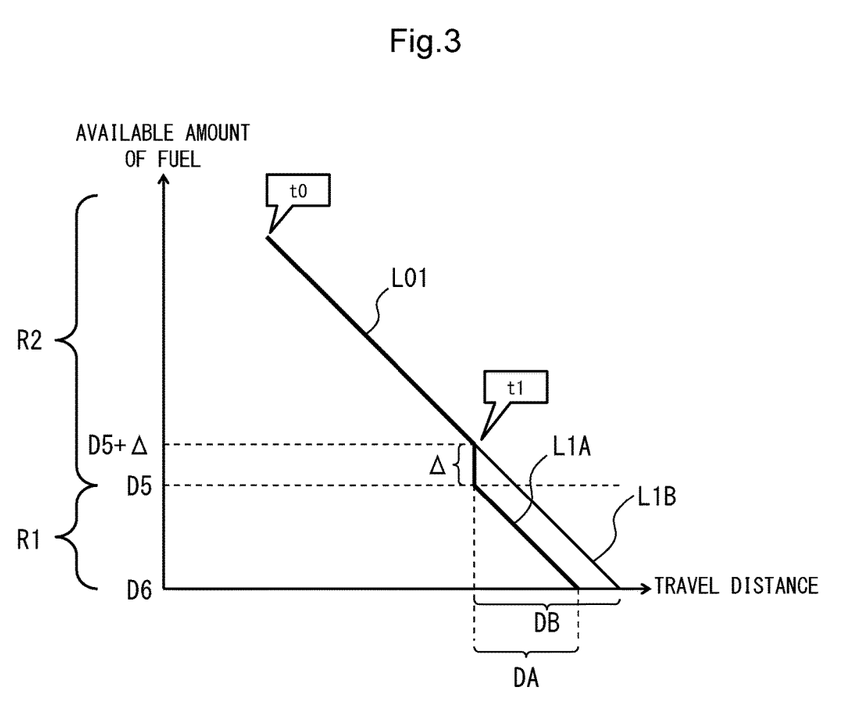
FIG. 3 is a graph schematically illustrative of a problem to be solved in the display device in case of using two sensors.

FIG. 3 is a graph schematically illustrative of a task to be addressed by the display device 1 which uses the two sensors 1S and 2S depicted in FIG. 2. The graph has a vertical axis representing the available amount of fuel AF and a horizontal axis representing the accumulated travel distance.

It is assumed that as a result of the vehicle having driven at a constant mileage, i.e., at a constant graph gradient, from time t0 to time t1 as indicated by a line L01 in FIG. 3, the first sensor 1S as the level gage detects that the available amount of fuel AF has reached the reserve point D5 at time t1. Ideally, as this time, the output of the second sensor 2S as the fuel sender unit should indicate the reserve point D5. Actually, however, the output of the second sensor 2S may represent "D5+Δ" that deviates from the reserve point D5 by an available amount-of-fuel difference Δ (Δ>0) due to tolerances of the fuel sender unit and/or the internal layout of the fuel tank and other factors. Although the available amount-of-fuel difference Δ is actually of a minute value, it is depicted exaggerated at an enlarged scale to clearly indicate its existence in FIG. 3. The exaggerated illustration also applies to FIG. 7.

In such a case, the available travel distance AD displayed on a display device not according to the present invention tends to change abruptly at time t1, making the driver feel strange and uneasy. Specifically, immediately prior to time t1, the displayed available travel distance AD is of a value DB on the horizontal axis which is represented by a line segment corresponding to an extension line L1B from the line L01 toward the out-of-gas point D6, on the basis of the output 2SO of the second sensor 2S. Immediately after time t1, however, the displayed available travel distance AD is of a value DA on the horizontal axis which is represented by a line segment corresponding to an extension line L1A from a position where the available amount of fuel AF has discontinuously decreased by an available amount-of-fuel difference Δ to the out-of-gas point D6 parallel to the line L01, on the basis of the more accurate output 1SO of the first sensor 1S.

As described above, at the time when the first sensor 1S detects the reserve point D5, the available amount-of-fuel difference Δ occurs by changing the value to be adopted as the available amount of fuel AF from the output 2SO of the second sensor 2S to the more accurate output 1SO of the first sensor 1S. Similarly, on account of the available amount-of-fuel difference Δ, the available travel distance AD calculated from the available amount of fuel AF and displayed is also likely to change DB to DA.

The display device 1 according to the present embodiment is able to address the above task and to change the available travel distance AD in smooth transition.

Figure 4:
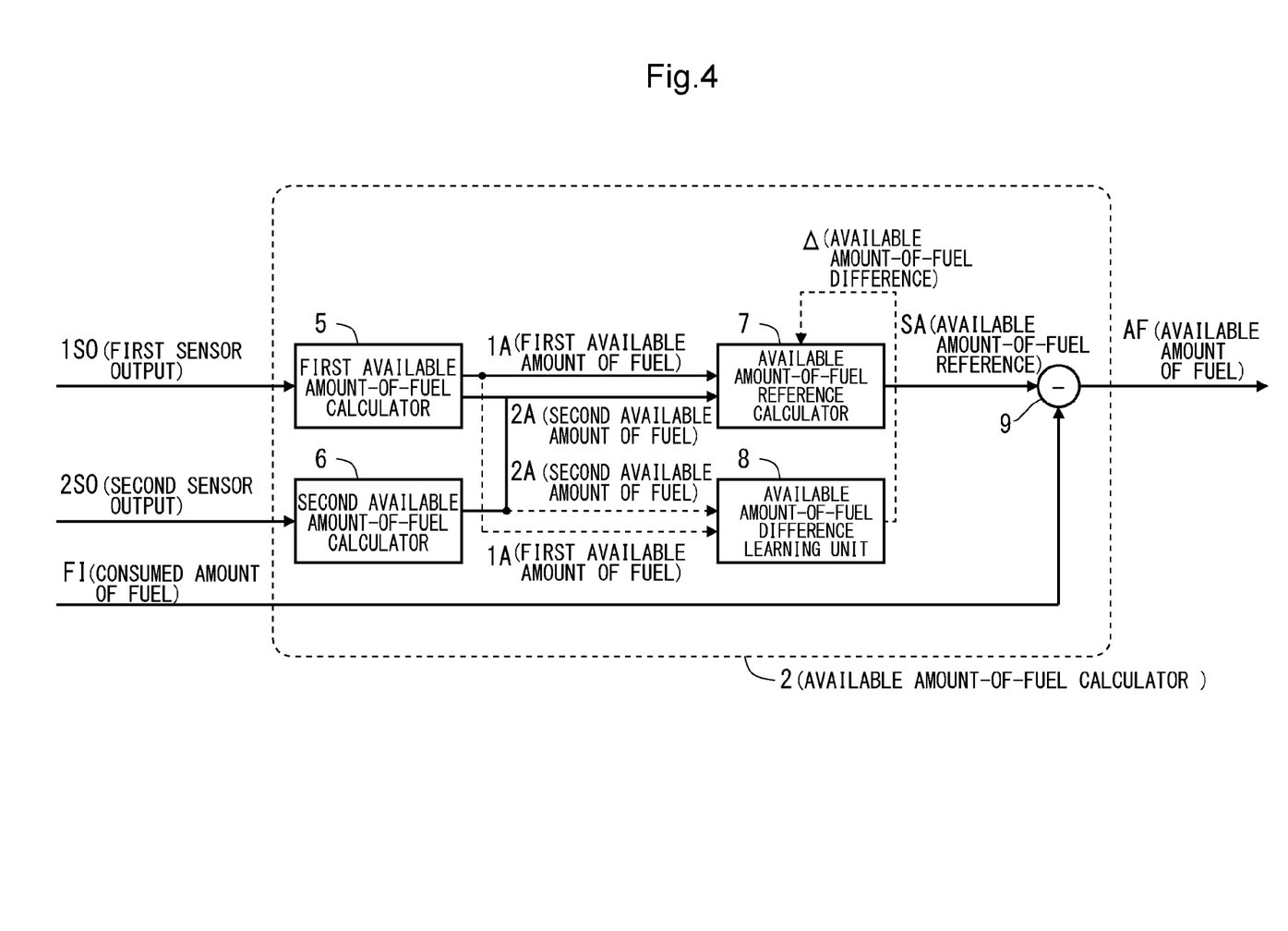
FIG. 4 is a functional block diagram of an available amount-of-fuel calculator.

FIG. 4 is a functional block diagram of the available amount-of-fuel calculator 2 that is configured to deal with the above task. The available amount-of-fuel calculator 2 includes a first available amount-of-fuel calculator 5, a second available amount-of-fuel calculator 6, an available amount-of-fuel reference calculator 7, an available amount-of-fuel difference learning unit 8, and a subtractor 9.

The available amount-of-fuel calculator 2 is capable of operating in an "available amount-of-fuel calculating phase" (hereinafter referred to as "calculating phase") for calculating an available amount of fuel AF thereby to display an available travel distance AD based on the available amount of fuel AF on the meter 30, and operating in an "available amount-of-fuel difference learning phase" (hereinafter referred to as "learning phase") independently of or concurrently with the calculating phase. The available amount-of-fuel calculator 2 can operate in the calculating phase by using a learned value Δ, which corresponds to an available amount-of-fuel difference Δ depicted in FIG. 3, as described later, determined in the learning phase. In FIG. 4, of the arrows representing flows of data between the functional blocks, broken-line arrows indicate major flows of data in the learning phase.

Processing sequences of these calculators 5 through 9 are as follows.

The first available amount-of-fuel calculator 5 receives the first sensor output 1SO from the first sensor 1S (level gage), and outputs an available amount of fuel 1A represented by the first sensor output 1SO, i.e., an available amount of fuel 1A that has reached the reserve point D5, to the available amount-of-fuel reference calculator 7 in the calculating phase and to the available amount-of-fuel difference learning unit 8 in the learning phase.

Providing the first sensor 1S is constructed as a level gage for outputting the time when the available amount of fuel AF has decreased to the reserve point D5, the first available amount-of-fuel calculator 5 may output only a trigger signal indicating that the available amount of fuel AF has reached the reserve point D5 to the available amount-of-fuel reference calculator 7 and the available amount-of-fuel difference learning unit 8. The available amount-of-fuel reference calculator 7 and the available amount-of-fuel difference learning unit 8 may detect the trigger signal received from the first available amount-of-fuel calculator 5 as indicating the time when the first sensor 1S has detected the available amount of fuel AF reaching the reserve point D5, and may acquire a specific value of the available amount of fuel AF at the reserve point D5 from the value stored in a memory in advance.

The second available amount-of-fuel calculator 6 receives the second sensor output 2SO from the second sensor 2S, and outputs an available amount of fuel 2A represented by the second sensor output 2SO, i.e., an available amount of fuel 2A that is measured by the fuel sender unit including the second sensor 2S, to the available amount-of-fuel reference calculator 7 in the calculating phase and to the available amount-of-fuel difference learning unit 8 in the learning phase.

The available amount-of-fuel reference calculator 7 operates in the calculating phase by using an available amount-of-fuel difference Δ as a learned value determined by the available amount-of-fuel difference learning unit 8 in the learning phase. The available amount-of-fuel reference calculator 7 performs a sorting-out process for determining whether the present time falls in a first period or a second period, and then selectively performs processing sequences corresponding individually to the first and second periods. The first period refers to here a period before the time when the first sensor 1S (level gage) outputs the arrival of the available amount of fuel AF at the reserve point D5, i.e., a period during which the available amount of fuel AF falls in the range R2 detected by the second sensor 2S. The second period refers to a period after the time when the first sensor 1S outputs the arrival of the available amount of fuel AF at the reserve point D5, i.e., a period during which the available amount of fuel AF falls in the range R1 up to the reserve point D5.

If the present time falls in the first period, then the available amount-of-fuel reference calculator 7 determines an available amount-of-fuel reference SA as representing a corrected value of the available amount of fuel AF measured by the second sensor 2S, i.e., the fuel sender unit, from the second available amount-of-fuel calculator 6, and outputs the determined available amount-of-fuel reference SA to the subtractor 9.

If the present time falls in the second period, then the available amount-of-fuel reference calculator 7 adopts a predetermined fixed value of the available amount of fuel AF at the reserve point D5 unchanged as an available amount-of-fuel reference SA, and outputs the available amount-of-fuel reference SA to the subtractor 9.

A detailed example of the above process of determining the available amount-of-fuel reference SA by the available amount-of-fuel reference calculator 7 will be described later with reference to FIG. 6.

The subtractor 9 operates in the calculating phase. If the present time falls in the first period, i.e., if the available amount of fuel AF is higher than the reserve point D5, then the subtractor 9 outputs the available amount-of-fuel reference SA unchanged to the available travel distance calculator 4. The available travel distance calculator 4 calculates an available travel distance using the supplied available amount-of-fuel reference SA, i.e., the corrected available amount of fuel AF.

If the present time falls in the second period, i.e., if the available amount of fuel AF is equal to or lower than the reserve point D5, then the subtractor 9 subtracts an added-up value of the injected amount of fuel FI, i.e., an added-up consumed amount of fuel, output from the FI-ECU 20 from the time when the available amount of fuel AF has reached the reserve point D5 to the present time, from the available amount-of-fuel reference SA obtained by the available amount-of-fuel reference calculator 7, i.e., the predetermined fixed value of the available amount of fuel AF at the reserve point D5, and outputs the calculated difference as an available amount of fuel AF to the available travel distance calculator 4.

It should be noted that the subtractor 9 performs no subtracting process in the first period, but performs the subtracting process in the second period.

The available amount-of-fuel difference learning unit 8 operates in the learning phase. The available amount-of-fuel difference learning unit 8 learns an available amount-of-fuel difference as a learned value and outputs the learned value to the available amount-of-fuel reference calculator 7. Specifically, the learned value represents the available amount-of-fuel difference $\Delta$ schematically illustrated in FIG. 3.

Figure 5:
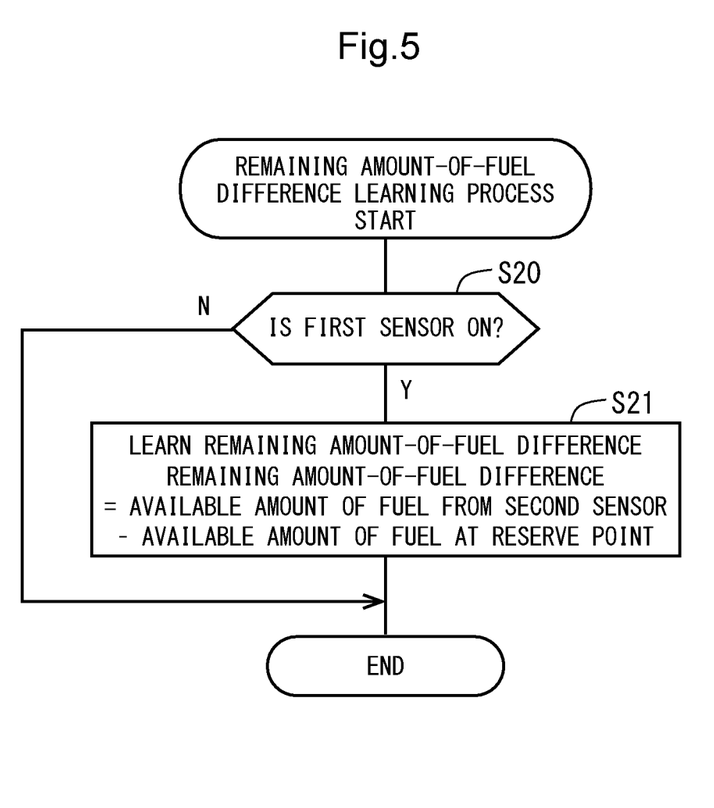
FIG. 5 is a flowchart of the process of learning an available amount-of-fuel difference as a learned value by an available amount-of-fuel difference learning unit.

FIG. 5 is a flowchart of the process of learning an available amount-of-fuel difference $\Delta$ as a learned value by the available amount-of-fuel difference learning unit 8. Steps of the process depicted in FIG. 5 will be described below. Since all the steps are carried out by the available amount-of-fuel difference learning unit 8, the available amount-of-fuel difference learning unit 8 may not be referred to as the doer of action (subject) in the description of the steps for the sake of brevity.

When the sequence of the process has started, it is determined in step S20 whether or not the output 1SO of the first sensor 1S has switched to "ON" at the present time, i.e., whether or not the first sensor 1S as the level gage has switched from a state in which it detects a fuel level to a state in which it detects no fuel level.

If the determination is negative in step S20, then the sequence is ended, and the learning process is not carried out.

If the determination is affirmative in step S20, then control goes to step S21. In step S21, an available amount-of-fuel difference $\Delta$ as a learned value is determined as the difference between sensor outputs at the present time according to the equation described below, after which the sequence is ended.

(Available amount-of-fuel difference $\Delta$)=(Available amount of fuel 2A output from second sensor 2S)−(Available amount of fuel 1A as predetermined fixed value at reserve point D5)

As can be seen from the process depicted in FIG. 5, the available amount-of-fuel difference learning unit 8 determines an available amount-of-fuel difference $\Delta$ as a learned value at the time when the first sensor 1S detects the available amount of fuel AF reaching the reserve point D5. The time when the first sensor 1S detects the available amount of fuel AF reaching the reserve point D5 is the time at which the calculation of the available amount of fuel AF switches from being based on the output 2A of the second sensor 2S to being based on the output 1A of the first sensor 1S. The available amount-of-fuel difference $\Delta$ as the learned value can be regarded as giving a feedback corrective value to the output 2A of the second sensor 2S as indicated in FIG. 4 as being input again to the available amount-of-fuel reference calculator 7.

Figure 6:
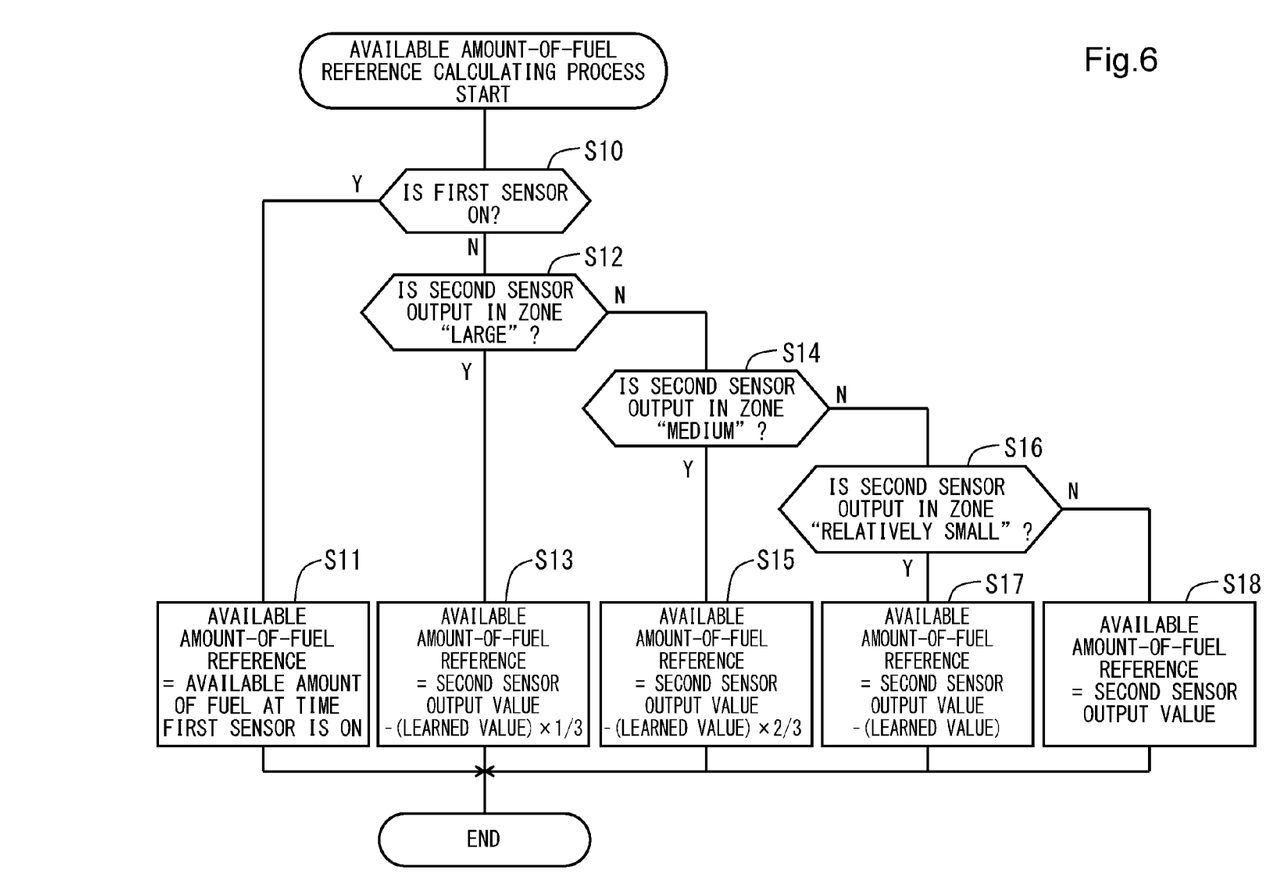
FIG. 6 is a flowchart depicting a detailed example of the process of determining an available amount-of-fuel reference in an available amount-of-fuel reference calculator.

FIG. 6 is a flowchart depicting a detailed example of the process of determining the available amount-of-fuel reference SA by the available amount-of-fuel reference calculator 7. Steps of the process depicted in FIG. 6 will be described below. Since all the steps are carried out by the available amount-of-fuel reference calculator 7, the available amount-of-fuel reference calculator 7 may not be referred to as the doer of action (subject) in the description of the steps for the sake of brevity.

When the sequence of the process has started, it is determined in step S10 whether or not the output 1SO of the first sensor 1S is "ON," i.e., whether or not the first sensor 1S as the level gage is in a state in which it detects no fuel level. If the determination in step S10 is affirmative, i.e., if the first sensor 1S is in a state in which it detects no fuel level, or the available amount of fuel AF is lower than the reverse point D5 and the present time falls in the second period, then control goes to step S11. If the determination in step S10 is negative, i.e., if the first sensor 1S is in a state in which it detects a fuel level, or the available amount of fuel AF is higher than the reverse point D5 and the present time falls in the first period, then control goes to step S12.

In step S11, a value of the available amount of fuel AF at the time when the output 1SO of the first sensor 1S switches to "ON," i.e., the available amount of fuel 1A as the predetermined fixed value at the reserve point D5, is set as a value of the available amount-of-fuel reference SA in the second period, and then the sequence is ended.

In step S12, it is determined whether or not the available amount of fuel 2A obtained by the second available amount-of-fuel calculator 6 on the basis of the output of the second sensor 2S falls in a predetermined zone corresponding to "large." If the determination is affirmative, then control goes to step S13, and if the determination is negative, then control goes to step S14.

The range R2 (D1 through D5) for the available amount of fuel 2A that can be output by the second sensor 2S is divided into four zones in the descending order of amounts of fuel, as described below. Step S12 determines whether or not the available amount of fuel 2A corresponds to "large" indicated by the second one of these four zones.

Zone "very large" . . . from the full-of-gas point D1 to the point D2 immediately therebelow Zone "large" . . . from the point D2 to the point D3 immediately therebelow Zone "medium" . . . from the point D3 to the point D4 immediately therebelow Zone "relatively small" . . . from the point D4 to the reserve point D5 immediately therebelow In step S13, the available amount-of-fuel reference SA is set as described below, and then the sequence is ended.

(Available amount-of-fuel reference $SA$)=(Second sensor output value $2A$)−(Learned value $\Delta$)×⅓

In step S14, it is determined whether or not the available amount of fuel 2A obtained by the second available amount-of-fuel calculator 6 on the basis of the output of the second sensor 2S falls in the zone "medium." If the determination is affirmative, then control goes to step S15, and if the determination is negative, then control goes to step S16.

In step S15, the available amount-of-fuel reference SA is set as described below, and then the sequence is ended.

(Available amount-of-fuel reference $SA$)=(Second sensor output value $2A$)−(Learned value $\Delta$)×⅔

In step S16, it is determined whether or not the available amount of fuel 2A obtained by the second available amount-of-fuel calculator 6 on the basis of the output of the second sensor 2S falls in the zone "relatively small." If the determination is affirmative, then control goes to step S17, and if the determination is negative, then control goes to step S18.

In step S17, the available amount-of-fuel reference SA is set as described below, and then the sequence is ended.

(Available amount-of-fuel reference $SA$)=(Second sensor output value $2A$)−(Learned value $\Delta$)×3/3

In step S18, the available amount-of-fuel reference SA is set as described below, and then the sequence is ended.

(Available amount-of-fuel reference $SA$)=(Second sensor output value $2A$)

If control goes to step S18, it means that the available amount of fuel 2A obtained by the second available amount-of-fuel calculator 6 on the basis of the output of the second sensor 2S falls in the zone "very large." If control goes to step S18, then the second sensor output value 2A is output uncorrected as an available amount-of-fuel reference SA (the corrective quantity in step S18 may be regarded as zero), in contrast to steps S13, S15, and S17 where the second sensor output value 2A is corrected by the learned value $\Delta$ to obtain an available amount-of-fuel reference SA.

The available amount-of-fuel reference calculator 7 carries out the process of determining the available amount-of-fuel reference SA according to the sequence depicted in FIG. 6 at each time t, and outputs an available amount-of-fuel reference (t) at each time t to the available travel distance calculator 4.

Figure 7:
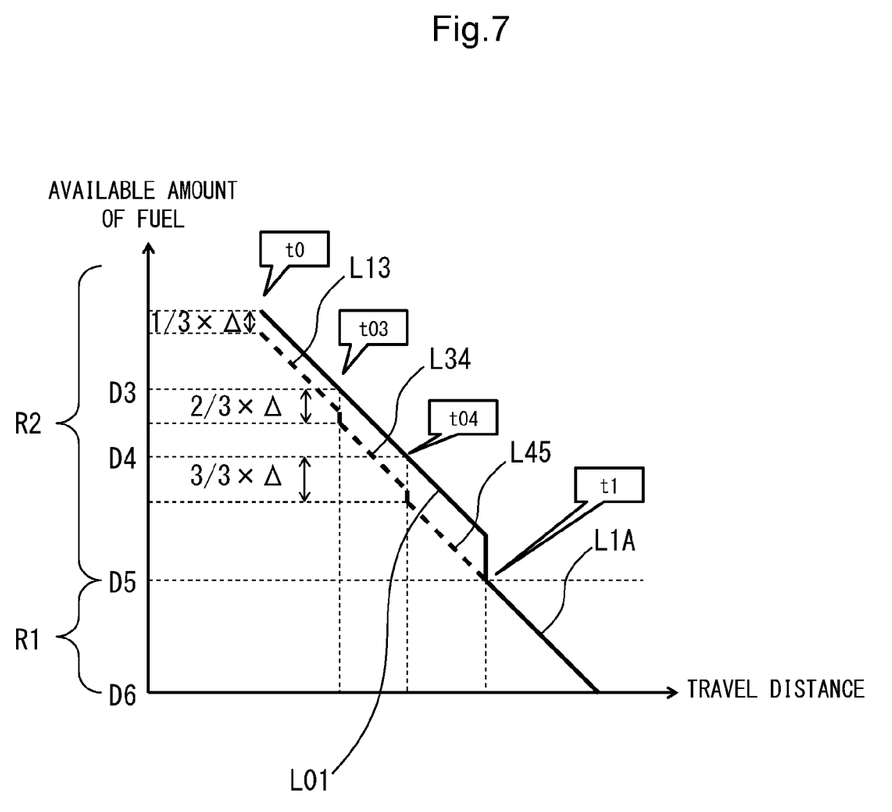
FIG. 7 is a diagram schematically depicting advantages of the present invention.

FIG. 7 is a diagram schematically depicting the advantages of the present invention. FIG. 7 depicts an example in which the available travel distance calculator 4 calculates and displays an available travel distance AD using the available amount of fuel AF calculated by being corrected by the available amount-of-fuel calculator 2 according to the sequence depicted in FIG. 6, i.e., using the available amount-of-fuel reference SA, thereby solving the task illustrated in FIG. 3.

FIG. 7 depicts, as a comparative example, the line L01 plotted when the vehicle has driven at a constant mileage from time t0 to time t1 as depicted in FIG. 3. The line L01 corresponds to a line plotted when the available amount-of-fuel reference calculator 7 performs no correction at all and outputs the second sensor output value 2A unchanged as an available amount-of-fuel reference SA.

In FIG. 7, the available amount-of-fuel reference SA determined as corrected by the available amount-of-fuel calculator 2 when the present invention applied according to the sequence depicted in FIG. 6 is represented by a series of lines L13, L34, and L45. Specifically, the line L13 from time t0 to time t03 indicates the available amount-of-fuel reference SA corrected by "⅓×$\Delta$" in step S13, the line L34 from time t03 to time t04 indicates the available amount-of-fuel reference SA corrected by "⅔×$\Delta$" in step S15, and the line L45 from time t04 to time t1 (the time when the reserve point D5 is reached) indicates the available amount-of-fuel reference SA corrected by "3/3×$\Delta$" in step S17. Since the corrective quantity is gradually changed in the zones corresponding to the lines L13, L34, and L45, the available amount-of-fuel reference SA is smoothly connected to the extension line L1A.

The lines L13, L34, and L45 depicted in FIG. 7 are joined to the extension line L1A after the reserve point D5 has been reached, more smoothly than the line L01 which is plotted when the present invention is not applied. According to the present invention, it is thus possible to eliminate or reduce fluctuations of the available travel distance AD displayed at the reserve point D5, allowing the available travel distance AD to be displayed in smooth transition at the reserve point D5.

Supplementary or additional remarks according to the present invention will be given below.

(1) According to the sequence depicted in FIG. 6, the range R2 (D1 through D5) for the available amount of fuel is divided into the four zones, so that the measured available amount of fuel 2A output from the second sensor 2S is corrected stepwise so as to become closer to the learned available amount-of-fuel difference $\Delta$ when it approaches the reserve point D5. However, the number of zones is not limited to four, and even if the range R2 is divided into a desired number of zones, the measured available amount of fuel 2A output from the second sensor 2S can be corrected stepwise according to the sequence depicted in FIG. 6. Similarly, the range R2 may not be divided into discrete zones, but the measured available amount of fuel 2A output from the second sensor 2S may be corrected continuously.

Particularly, when the range R2 is divided into the four zones as depicted in FIG. 6, the three corrective coefficients k=⅓, ⅔, and 3/3 are established, and values k×$\Delta$ that are produced by multiplying the learned available amount-of-fuel difference $\Delta$ by the corrective coefficients k are subtracted from the measured available amount of fuel based on the second sensor output 2A, thereby correcting the measured available amount of fuel 2A. If the range R2 is divided into (N+1) zones, in general, then the measured available amount of fuel 2A can be corrected similarly using corrective coefficients k=1/N, 2/N, . . . , (N−1)/N, and N/N that are larger as the measured available amount of fuel 2A approaches the reserve point D5.

(2) According to the sequence depicted in FIG. 6, there is employed a method in which from a time "before" the reserve point D5 is reached, the available amount of fuel AF is gradually corrected to determine an available amount-of-fuel reference SA, so that the learned available amount-of-fuel difference Δ can be eliminated by the available amount-of-fuel reference SA at the time the reserve point D5 is reached. According to another method, the correction process based on the available amount-of-fuel reference SA may be carried out "after" the reserve point D5 is reached. Specifically, no correction process may be carried out before the reserve point D5 is reached, allowing an available amount-of-fuel difference Δ to be present at time t1 depicted in FIG. 3, and an available amount-of-fuel reference "D5+Δ" may be employed though the reserve point D5 is reached, so that the available amount of fuel may be corrected gradually to bring the position of the tip end of the extension line L1B depicted in FIG. 3 into alignment with the position of the tip end of the extension line L1A, i.e., the position indicative of the available travel distance DA.

(3) When the available amount-of-fuel reference calculator 7 is to adopt a learned value Δ determined by the learning process performed by the available amount-of-fuel difference learning unit 8 exemplified by reference to FIG. 5, the available amount-of-fuel reference calculator 7 may use a statistical representative value such as an average value of a series of learned values Δ produced when the learning process is carried out a plurality of times, or may use the latest learned value Δ, or may use a weighted average value based on a learning time.

(4) The display device 1 according to the above embodiment has been illustrated as being applied to a vehicle such as a motorcycle or the like. The principles of the present invention are also applicable to other vehicles such as three- or four-wheeled vehicles insofar as the shape of the fuel tank and the sensor arrangement are the same where the cross-sectional shape of the fuel tank is varying in the range detectable by the second sensor 2S and the available amount of fuel can be calculated highly accurately when it is up to the reserve point D5 detected by the first sensor 1S.

REFERENCE SIGNS LIST

1 . . . display device for displaying available travel distance of vehicle,
2 . . . available amount-of-fuel calculator,
3 . . . average mileage calculator,
4 . . . available travel distance calculator,
T . . . fuel tank,
1S . . . first sensor,
2S . . . second sensor,
30 . . . meter,
1A . . . available amount of fuel based on output from first sensor,
2A . . . available amount of fuel based on output from second sensor,
1SO . . . first sensor output,
2SO . . . second sensor output,
D5 . . . reserve point

What is claimed is:

1. A display device for displaying an available travel distance of a vehicle by calculating an available amount of fuel in a fuel tank on the basis of outputs of a first sensor and a second sensor which are provided in the fuel tank,
the second sensor detecting the available amount of fuel in the fuel tank at a fuel level higher than a reserve point in the fuel tank,
the display device comprising:
an electronic control unit (ECU) that comprises:
an available amount-of-fuel calculator configured to calculate the available amount of fuel from the output of the first sensor at a fuel level lower than the reserve point and from the output of the second sensor at a fuel level higher than the reserve point,
an average mileage calculator configured to calculate an average mileage from a consumed amount of fuel and a vehicle's traveled distance per unit time, and
an available travel distance calculator configured to calculate the available travel distance from the available amount of fuel and the average mileage; and
a display configured to display the available travel distance,
wherein the available amount-of-fuel calculator uses a learned value based on the outputs of the first and second sensors as a corrective value for correcting the output of the second sensor when the calculation of the available amount of fuel switches from being based on the output of the second sensor to being based on the output of the first sensor.

2. The display device for displaying the available travel distance of the vehicle according to claim 1,
wherein the first sensor detects a fuel level at the reserve point in the fuel tank, and
the second sensor includes a sensor of a fuel sender unit.

3. The display device for displaying the available travel distance of the vehicle according to claim 2,
wherein the available amount-of-fuel calculator calculates the available amount of fuel on the basis of the output of the second sensor at a fuel level higher than the reserve point, as an available amount-of-fuel reference by correcting a measured available amount of fuel represented by the output with the learned value.

4. The display device for displaying the available travel distance of the vehicle according to claim 3,
wherein the learned value includes a difference between the measured available amount of fuel represented by the output of the second sensor when the first sensor detects the reserve point and a predetermined available amount of fuel at the reserve point.

5. The display device for displaying the available travel distance of the vehicle according to claim 4,
wherein the available amount-of-fuel calculator calculates the available amount-of-fuel reference by subtracting a value produced by multiplying the learned value that includes the difference by a corrective coefficient which varies as the measured available amount of fuel represented by the output approaches the reserve point, from the measured available amount of fuel.

6. The display device for displaying the available travel distance of the vehicle according to claim 2,
wherein the learned value includes a difference between the measured available amount of fuel represented by the output of the second sensor when the first sensor detects the reserve point and a predetermined available amount of fuel at the reserve point.

7. The display device for displaying the available travel distance of the vehicle according to claim 6,
wherein the available amount-of-fuel calculator calculates the available amount-of-fuel reference by subtracting a value produced by multiplying the learned value that includes the difference by a corrective coefficient which varies as the measured available amount of fuel represented by the output approaches the reserve point, from the measured available amount of fuel.

8. The display device for displaying the available travel distance of the vehicle according to claim 1,
wherein the available amount-of-fuel calculator calculates the available amount of fuel on the basis of the output of the second sensor at a fuel level higher than the reserve point, as an available amount-of-fuel reference by correcting a measured available amount of fuel represented by the output with the learned value.

9. The display device for displaying the available travel distance of the vehicle according to claim 8,
wherein the learned value includes a difference between the measured available amount of fuel represented by the output of the second sensor when the first sensor detects the reserve point and a predetermined available amount of fuel at the reserve point.

10. The display device for displaying the available travel distance of the vehicle according to claim 9,
wherein the available amount-of-fuel calculator calculates the available amount-of-fuel reference by subtracting a value produced by multiplying the learned value that includes the difference by a corrective coefficient which varies as the measured available amount of fuel represented by the output approaches the reserve point, from the measured available amount of fuel.

11. The display device for displaying the available travel distance of the vehicle according to claim 1,
wherein the learned value includes a difference between the measured available amount of fuel represented by the output of the second sensor when the first sensor detects the reserve point and a predetermined available amount of fuel at the reserve point.

12. The display device for displaying the available travel distance of the vehicle according to claim 11,
wherein the available amount-of-fuel calculator calculates the available amount-of-fuel reference by subtracting a value produced by multiplying the learned value that includes the difference by a corrective coefficient which varies as the measured available amount of fuel represented by the output approaches the reserve point, from the measured available amount of fuel.

\* \* \* \* \*